July 6, 1943.  L. WISE  2,323,638
SOUND AND PICTURE APPARATUS
Filed Jan. 29, 1941  3 Sheets-Sheet 1

INVENTOR
Lawrence Wise.
BY
Samuel Ostrolenk
ATTORNEY.

July 6, 1943.   L. WISE   2,323,638
SOUND AND PICTURE APPARATUS
Filed Jan. 29, 1941   3 Sheets-Sheet 2
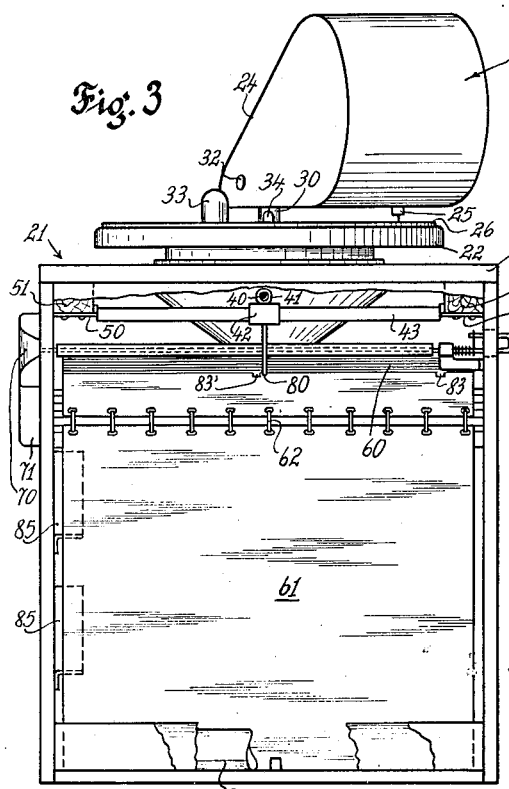
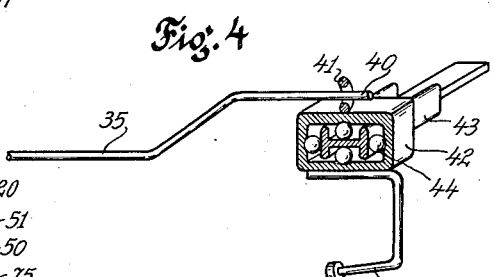
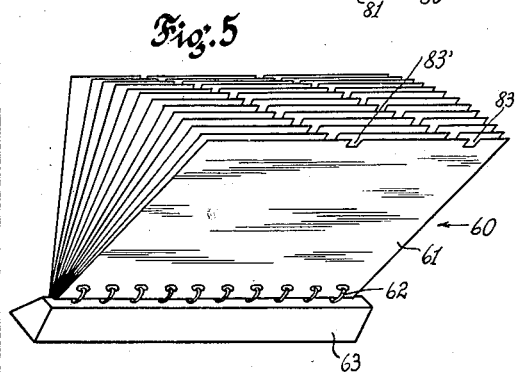
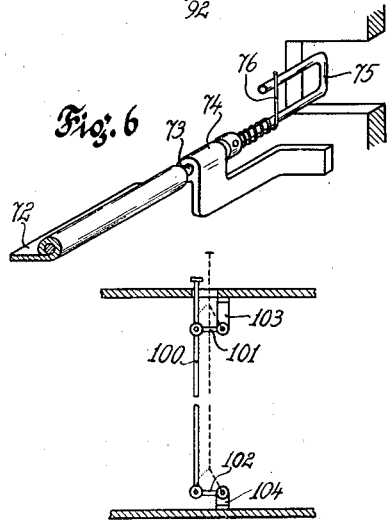
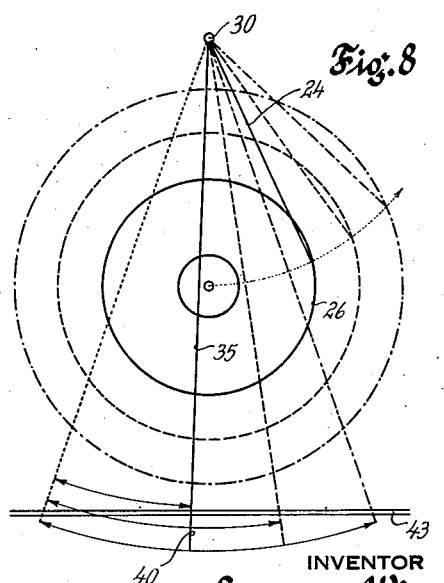
INVENTOR
Lawrence Wise.
BY
Samuel Ostrolech
ATTORNEY.

July 6, 1943.    L. WISE    2,323,638
SOUND AND PICTURE APPARATUS
Filed Jan. 29, 1941    3 Sheets-Sheet 3
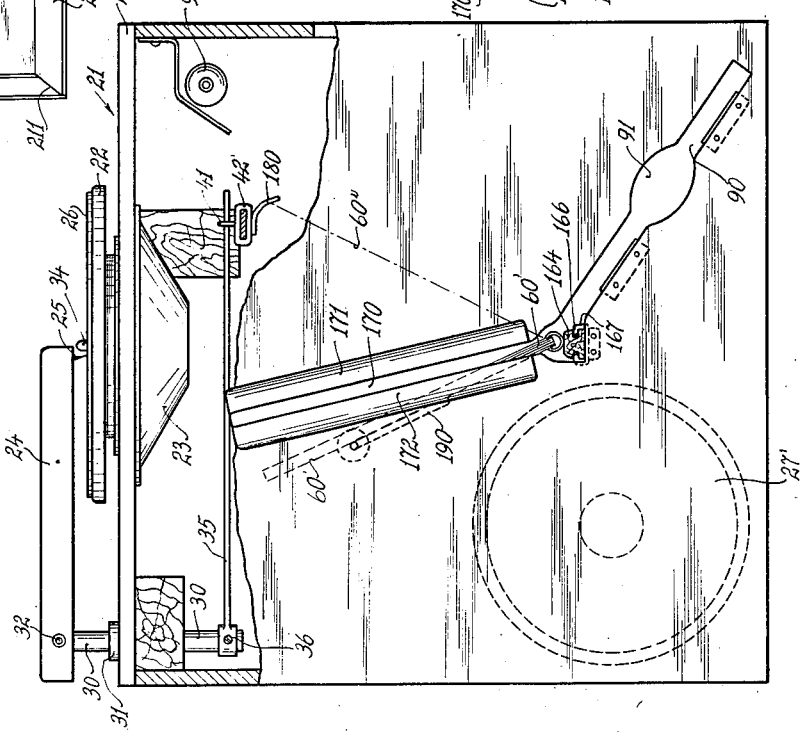
INVENTOR
Lawrence Wise.
BY
Samuel Ostrolenk
ATTORNEY.

Patented July 6, 1943

2,323,638

UNITED STATES PATENT OFFICE 2,323,638

SOUND AND PICTURE APPARATUS

Lawrence Wise, Bronx, N. Y., assignor to Richard N. Briefer, Brooklyn, N. Y.

Application January 29, 1941, Serial No. 376,423

14 Claims. (Cl. 40—28)

This invention relates to apparatus for home entertainment and more particularly to combination sound reproducing apparatus and synchronizing means associated therewith for presenting visual indicia directly related to the subject matter aurally reproduced.

While child education and entertainment constitutes an important field within which the present invention may be used, it is by no means limited thereto, but indeed, as will be obvious, may be adapted for use in many other fields.

Essentially, the basic principle comprises means for presenting a series of visual impressions dramatically synchronized with successive portions of a sound record played in a phonograph.

When the device is used in connection with the education or entertainment of children, then various scenes from stories, songs or nursery rhymes popular with children may be illustrated as the sound record proceeds; or various objects or natural phenomena may be successively visually illustrated as their verbal description proceeds.

For these purposes, and in order to adapt the apparatus for use and operation, not merely by the unskilled operator, but even by a pre-school age child, it is necessary that each of the elements of the invention be of the simplest possible nature.

Accordingly, an object of the present invention is the provision of means for successively presenting a series of pictures in synchronism with the subject matter aurally presented by sound reproducing apparatus.

While the amount and quality of impression given through the auditory sense alone in the case of standard records is very limited since subject matter must be covered in a short space of time by words alone, the use of dramatically timed pictures not only complements the records, but substantially increases the quantity and quality of the impressions conveyed and thus extends the educational and entertainment value of the device.

A further object of the present invention is provision of means associated with and operable by the tone arm of a phonograph for presenting the succession of pictures above mentioned.

Since it is necessary and desirable that utmost simplicity of operation and inexpensiveness and ruggedness of construction be preserved, still a further object of the present invention is the arrangement for successively presenting the series of pictures in such a simplified manner that the entire mechanism may be operated merely by the movement of the needle in the groove of the conventional record disc which in turn operates the tone arm.

Still a further object of the present invention is the mounting of an additional arm or lever on the post of the tone arm of a phonograph for turning the pages of a book.

Another object of the present invention is the translation of the arcuate motion of the tone arm into a linear movement of a member operable to permit the movement of the pages of a book.

Yet another object of the present invention is the provision of a book having a special binding and mounting and securing means for quickly positioning the book in predetermined relation to the remainder of the apparatus aforementioned so that all of the elements may properly cooperate to present the successive visual impressions in the manner above set forth, and to provide fool-proof and easy means for interchanging books for various records.

A further object of this invention is the provision of means within the structure of one book to permit one, two, or more stories to be related without necessarily changing the book, and to present in a single book stories integrated with a plurality of records.

These and many other objects of the present invention will, in part, be apparent, and, where not apparent, pointed out in the following description and drawings in which:

Figure 3 is a front view, partially broken away, of the apparatus of Figures 1 and 2.

Figure 4 is a fragmentary view in perspective of the book page turning element of my invention showing the cooperation thereof with the lever operated by the one arm.

Figure 5 is a view in perspective of a book adapted to cooperate with the elements of Figures 1 to 4.

Figure 6 is a fragmentary view in perspective of the book supporting a guiding element of Figures 1 to 4.

Figure 7 is a top view of a modification of the element of Figure 6.

Figure 8 is a diagram illustrating the relationship between the movement of the tone arm and the operating lever.

Figures 9 and 10 are cross-sectional views illustrating a modification of the element of Figure 4.

Figure 11 is a view in cross-section illustrating a modification of the book binding.

Figure 12 is a side view, with the side panel partially broken away, of a modified form of the mechanism of Figure 1.

Figure 13 is a front view, partially broken away, of the device of Figure 12.

Figure 14 is a front view showing a slight modification of the form of Figure 3.

Figure 1:
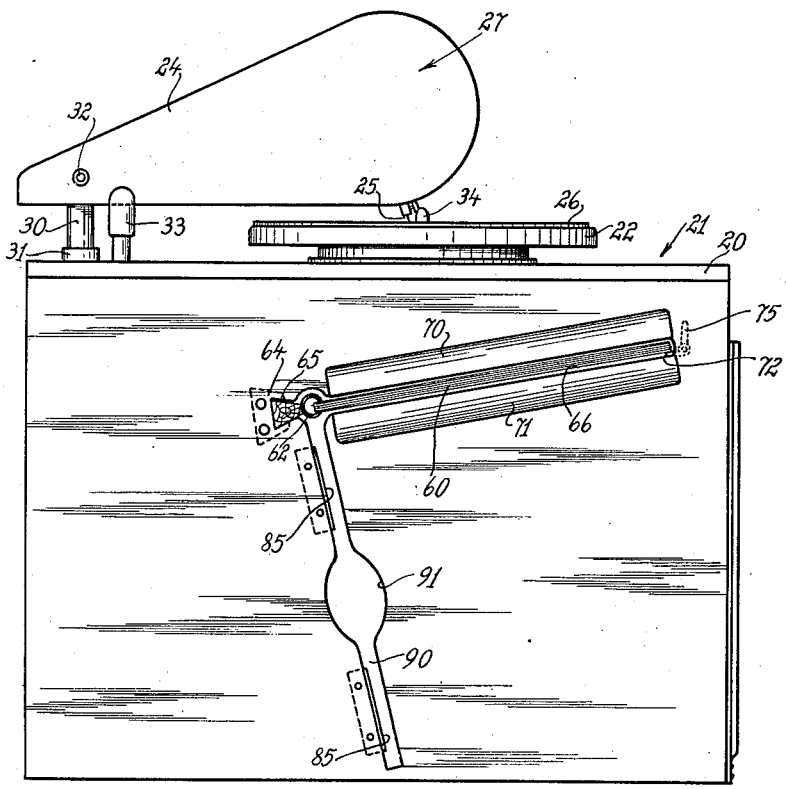
Figure 1 is a side view illustrating one form which my device may take.

Referring now to Figures 1 to 6, inclusive, I have here shown a sound reproducing apparatus mounted on the top panel 20 of a cabinet 21. The sound reproducing apparatus may be of any conventional form provided that it has a tone arm which is caused to swing in a plane parallel to the surface of a record disc by reason of the tracking of a needle in a spiral groove of the record disc.

The sound reproducing apparatus, as shown here, comprises a turn table 22 operated by any suitable power source as for instance the motor 23, and having a tone arm 24 the needle 25 of which tracks in a spiral groove in the record disc 26.

While the tone arm and pick up 24 may have any form desired, it is here shown as one which mechanically translates vibrations induced in the needle 25 into sounds which are heard in a loud speaker positioned in the region 27 of the arm.

Tone arm 24 is keyed to the post 30 in any suitable manner so that the rotation or swing of the tone arm in a plane parallel to the record surface results in rotation of the post 30 in its journal 31. The tone arm may, however be swung vertically about the pivot 32 to permit engagement or disengagement of the needle 25 with the record 26. A suitable stop 33 may, if desired, be provided to prevent movement of the tone arm 24 beyond the spindle 34 about which the turntable 22 rotates.

An operating lever 35 (see particularly Figure 2) is keyed to the post 30 in any suitable manner as for instance by the set-screw 36 and is positioned beneath the top panel 20. The operating lever 35 thus rotates in a plane parallel to and beneath the top panel in accordance with the rotary motion of the post 30 transmitted to it by the tone arm 24 and caused by the tracking of the needle 25 in the groove of record 26.

The free end 40 of the operating arm 35 is caught in the loop 41 of the slide 42 which in turn is mounted upon and slidable along bar 43.

As will be noted, especially in Figure 4, the slide 42 is preferably a hollow rectangular tubular member of limited length and may have any desired inner cross-sectional arrangement adapted to facilitate movement thereof along the bar 43. Thus, as may be seen, the bar 43 may be of H beam or I beam formation and appropriate ball bearings 44 and race-ways therefor may be provided. Although, however, I have found that, in actual use, the bar 43 may be a simple square, oval or rectangular bar (the corners of which may, if desired, be slightly rounded off) and the slide 42 may be a close fit around it.

It should now be obvious that movement of the tone arm 24, occasioned by the tracking of needle 25 in the groove of record 26, will, through the rotation of post 30 induced thereby, cause a rotation of the operating lever 35 which will in turn cause the slide 42 to move along the bar 43. The position of the slide therefore will always be determined by the position of the operating lever.

Although the movement of the operating lever 35 is rotary, this motion is translated by means of the slide 42 into linear movement along the bar 43. It is necessary therefore that the end 40 of the operating lever 35 be sufficiently long so that it will always be captured by and never escape from the loop 41 on the slide 42. This means that, since the bar 43 actually is a chord along the arc traversed by the end of the operating lever, the end 40 of the said lever should be sufficiently long to engage the loop 41 when the slide is near either end of the bar as in Figure 4.

The bar 43 may be secured in position beneath the top panel 20 in any suitable manner as for instance by the plates 50 bolted or screwed to the rabbets 51.

The movement of the slide 42 therefore may now be utilized to permit the pages of the book 60 to be rotated.

In Figure 5 I have shown the formation and construction of a book 60 which is especially adapted to cooperate with the foregoing mechanical elements of my device. The pages 61 of the book 60 are bound together by a series of rings 62 passing loosely through a series of corresponding perforations in each of the pages so that the pages may rotate readily and that gravity alone may be used to effect such rotation, while the book and the pages thereof are secured against unintentional lateral displacement.

The rings 62 are secured to a suitable base 63 which in the construction shown in Figure 5 is preferably of trapezoidal cross-section in order to cooperate with the mounting means 64 of the apparatus which secures the book in position for operation.

Figure 2:
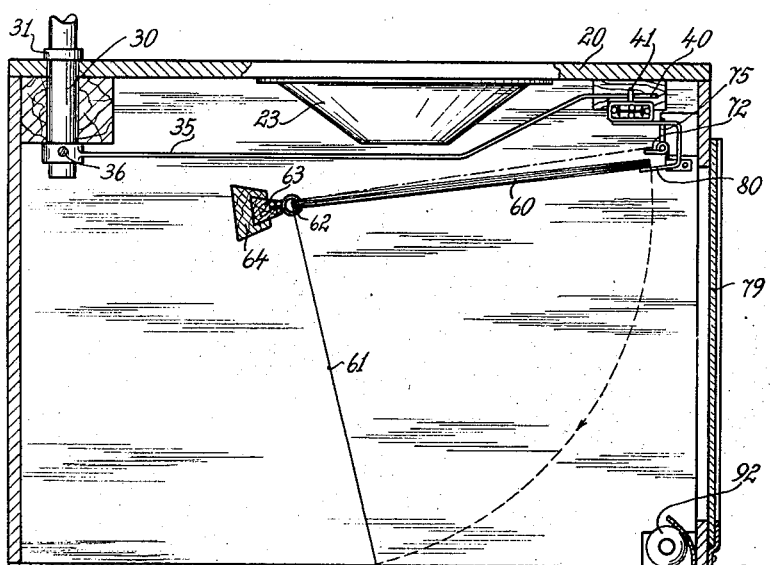
Figure 2 is a view corresponding to that of Figure 1 with a side panel removed showing the operating mechanism.

As will be noted especially in Figures 1 and 2, the mounting means 64 which are secured in any suitable manner between the side panels of the cabinet, has a slot 65 of trapezoidal cross-section therein. The base 63 may readily, therefore, be slid into the slot and by reason of the formation of the base and slot, secured therein.

That is, the only way in which the book may be inserted or withdrawn is by sliding the base along the slot and it cannot be dislodged from the slot along a line normal to the slot. A slot 66 is provided in the side panel so that the book while closed may be slid slowly into the device. Guiding elements 70 and 71 may be mounted on either side of the slot 66 in order to facilitate the movement of the book therein.

When the book is slid into the slot 66 and when the base 63 thereof is completely within the cabinet, the book 60 may be supported at the free end thereof by the swinging bar 72. As will be seen, particularly in Figure 6, the swinging bar 72 is mounted on a record 73 journalled in appropriate bearings 74 which are secured in any suitable manner to the side panel.

The record 73 has a handle 75 of any suitable form projecting from one of the side panels (see also Figure 3) so that the swing bar 72 may be rotated out of supporting position.

A torsion spring 76 is secured between the bearing 74 and a portion of the handle 75 in such a manner as to bias the swinging bar 72 to the book end supporting position. In actual use, however, I have found that gravity alone may be relied on to return the bar 72 to supporting position.

When, as seen in Figure 1, the book is slid into the slot 62 it is supported out of operating engagement with the remaining elements of the device. After the book has been slid into position the turn-table started and the tone arm 24 appropriately adjusted, then rotation of the swinging bar 72, will in the manner shown in Figure 2, permit the end of the pages of the book 60 to drop down upon the pin 80 which is carried by the slide 42. This pin may have any suitable form and may, if desired, have at the free end thereof a roller 81 facilitating movement thereof along the under side of the pages of the book.

The supporting bar 72 permits the quick positioning of the book in the device without interferring with any of the other mechanisms and also makes it possible for the tone arm 24, the operating lever 35, the slide 42 and the needle 80 to be appropriately positioned with respect to a record before the book is made to engage with the remainder of the mechanism.

By this means, therefore, it is possible to adjust the mechanism after the book has been inserted in position without causing any of the pages of the book to drop.

The pages 61 of the book are not notched at 83. The notches are staggered so that movement of the operating lever and consequent movement of the pin 80 in accordance with the movement of the needle 25 on the record disk 26, will cause the pages to drop successively in any predetermined timed relationship to the subject on the record. And no fixed amount of pages are required for any given book.

In Figure 3 certain of the pages 61 of the book are shown to be dropped. The pages which have dropped come to rest against the stops 85 which are secured in any suitable manner to the side panels of the cabinet.

After the record has been finished and all of the pages of the book successively dropped by reason of the movement of the pin 80 then all of the pages of the book will be aligned with the slot 90 in the side panel and the book may thereafter be readily withdrawn through said slot.

The slot 90 may be enlarged at 91 in order to permit the fingers of the user to grasp the book readily for withdrawal purposes. Although I have here shown the slots on the same side of the cabinet, the insertion and removal slots may, of course, be on opposite sides. Where slots are not desired, the side of the cabinet may be provided with a hinged panel or door to give access to the interior.

A suitable light or other means 92 may be provided at the bottom of the cabinet in order to illuminate the pages which have dropped. The front of the cabinet is open so that the dropped pages may readily be viewed.

It will now be obvious that the book and especially the notches 83 thereof, may be synchronized with any appropriate record disk 26 so that the pages of the book may successively come into view in synchronism with the successive portions of the record.

A series of additional notches 83' may be provided in the pages of the book so that when the opposite side of the record is rotated, the book may, after withdrawal, be reversed and the opposite end thereof inserted in the device so that opposite sides of the pages will fall into view.

Various elements of this device may be modified in various ways in order to effect the foregoing operation. Thus, for instance, instead of the rotatable supporting bar 72, a sliding supporting bearing 100 may be used, the said bearing being pivoted on rings 101 and 102 which in turn are pivoted on bearings 103 and 104 secured to the side panels. The bearings 100 may be a suitable spring being held in the supporting position shown in Figure 7 but a pull on the projecting handle member on the bearing 100 will move it to the non-supporting position indicated by the dotted lines in Figure 7. Also, the tone arm 24 may move over only half of the top surface of the cabinet or less than half thereof. The operating lever 35 may be caused to move beneath almost the entire area of the top panel.

As seen in the diagram of Figure 8, the tone arm 24 may be set at an angle to the operating lever 35 as indicated by the solid lines. The various movements of the tone arm 34 over half of the turn table will result by reason of this angular setting in a movement of the end 40 of the operating lever over almost the width of the cabinet.

As has been heretofore pointed out the slide as well as the pin may take many different forms. Thus for instance, as seen in Figures 9 and 10, the pin 80' mounted on the slide 42' may be rotatable about the pivot 110 with suitable spring means to bias the pin 80' to the position shown in Figure 9.

When the supporting bar 72 has been removed then the weight of the book dropping down on the pin 80' will depress the pin to the position shown in Figure 10 and thus clear the book from the supporting bar 72. Instead of a rotatable mounting being required, a relatively flat leaf spring may be used to effect the same result.

In Figures 12 and 13 I have shown a somewhat modified form which tends, however, to increase the size and weight of the cabinet. In this form the tone arm 24 does not have the loud speaker contained therein but the loud speaker 27' is elsewhere provided. Otherwise the mounting and operation of the tone arm and the operation of the operating arm and the slide is the same as previously described.

In the device shown in Figures 12 and 13, however, the book arrangement is somewhat different and hence the arrangement of the pin 180 on the slide 42 is also somewhat different. In this case the book 60' is mounted on a base 164 having lateral notches 166 therein which will engage in turn flanges of a slide 167 supported between the side panels of the cabinet.

The base 164 is manually positioned into the slide 167 and the book is pushed through the slot 170 being guided therein by suitable guide members 171 and 172. When the book is completely in the cabinet it falls backwards against the rest 190 which is rotatably mounted between the sides of the cabinet. Since the book is at this time not engaged against the pin 180 suitable adjustments of the tone arm may be freely made with respect to the record.

When it is desired to start the record and cause the rotation of the pages of the book to start in synchronism therewith, a rotation of the handle 181 will cause the rest 190 to rotate and move the book 60' to the position shown by the dotted line 60'' of Figure 12 so that the edges of the pages come to rest against the pin 180.

Since the book is now inclined so that the pages will tend to drop, movement of the operating arm by reason of the tone arm induced in the manner previously described will cause the pages of the book to fall in synchronism with the record. The pages fall against the stops 85 as hereinbefore described. The light 92' serves to illuminate the pages of the book also in the manner previously described.

The base of the book may take any suitable form which permits the book to be slid into position and which does not permit any other movement of the book once it is in the cabinet. Thus as is seen in Figure 11, the base 264 may be a simple rectangular base which may cooperate with the flanges of the slide 167 to appropriately position the book.

As is seen in Figure 14 the front of the cabinet may be modified or flanged to conceal any of the apparatus other than the pages of the book which have fallen. Thus angularly positioned panels 210 may be provided meeting along mitred edges 211, thus ensuring that the sight will be guided to the particular page 61 which has fallen.

By this means it is possible to view the image from a position slightly to the side of the front of the device and the view is not necessarily to the front of the device itself. The height or eye-level may likewise be adjusted at the top of the device of Figure 14.

In the foregoing I have described my device in connection with specific embodiments thereof only. Many variations of this device should now be obvious to those skilled in the art. Accordingly, I prefer to be bound not by the specific disclosures therein but only by the appended claims.

I claim:

1. In combination, a sound reproducing device having a rotatable turn-table for carrying a spirally grooved record disc, a rotatable post, a tone arm mounted at one end on said rotatable post and carrying at the other end a needle engageable with the groove of said record disc, rotation of said turn-table and the engagement of the groove of said record disk with said needle causing said tone arm to swing across said record and causing said post to rotate; a plurality of sheets carrying visually perceptible indicia, means operable by said rotatable post for successively presenting said sheets to view in synchronism with the record disc.

2. In combination, a sound reproducing device having a rotatable turn-table for carrying a spirally grooved record disc, a rotatable post, a tone arm mounted at one end on said rotatable post and carrying at the other end a needle engageable with the groove of said record disc, rotation of said turn-table and the engagement of the groove of said record disk with said needle causing said tone arm to swing across said record and causing said post to rotate; a plurality of sheets carrying visually perceptible indicia, and an operating lever secured to said post and rotatable thereby for successively presenting said sheets to view in synchronism with the record disc.

3. In combination, a sound reproducing device having a rotatable turn-table for carrying a spirally grooved record disc, a rotatable post, a tone arm mounted at one end on said rotatable post and carrying at the other end a needle engageable with the groove of said record disc, rotation of said turn-table and the engagement of the groove of said record disk with said needle causing said tone arm to swing across said record and causing said post to rotate, a plurality of sheets carrying visually perceptible indicia; an operating lever secured at one end to said post and rotatable thereby, the opposite end of said operating lever engaging a slide; said slide engaging said sheets; cooperating means on said slide and said sheets for successively releasing said sheets in accordance with the movement of said slide; rotation of said operating lever moving said slide, and successively presenting said sheets to view in synchronism with the record disc.

4. In combination, a sound reproducing device having a rotatable turn-table for carrying a spirally grooved record disc, a rotatable post, a tone arm mounted at one end on said rotatable post and carrying at the other end a needle engageable with the groove of said record disc, rotation of said turn-table and the engagement of the groove of said record disk with said needle causing said tone arm to swing across said record and causing said post to rotate; a plurality of sheets carrying visually perceptible indicia; an operating lever secured at one end to said post and rotatable thereby, the opposite end of said operating lever engaging a slide; said slide being slidable along a bar; a member on said slide supporting one end of said sheets in one position, means on said sheets for successively releasing said sheets from said support in accordance with the movement of said slide; rotation of said operating lever moving said slide and successively presenting said sheets to view in synchronism with the record disc.

5. In combination, a sound reproducing device having a rotatable turn-table for carrying a spirally grooved record disc, a rotatable post, a tone arm mounted at one end on said rotatable post and carrying at the other end a needle engageable with the groove of said record disc, rotation of said turn-table and the engagement of the groove of said record disc with said needle causing said tone arm to swing across said record and causing said post to rotate; a plurality of sheets carrying visually perceptible indicia; an operating lever secured at one end to said post and rotatable thereby, the opposite end of said operating lever engaging a slide; said slide being linearly slidable along a straight bar, a pin on said slide supporting one edge of each of said sheets in one position, staggered notches in said edges of said sheets successively registerable with said pin as the slide is moved by said operating lever and releasing said sheets from said pin; rotation of said operating lever moving said slide and successively presenting said sheets to view in synchronism with the record disc.

6. In combination, a sound reproducing device having a rotatable turn-table for carrying a spirally grooved record disc, a rotatable post, a tone arm secured at one end to said rotatable post and carrying at the other end a needle engageable with the groove of said record disc, rotation of said turn-table and the engagement of the groove of said record disk with said needle causing said tone arm to swing across said record and causing said post to rotate; a plurality of sheets carrying visually perceptible indicia, an operating lever secured at one end to said post and rotatable thereby, the opposite end of said lever passing through a loop on a slide; said slide being slidable along a bar; a member on said slide supporting one end of said sheets in one position, means on said sheets for successively releasing said sheets from said support in accordance with the movement of said slide; an operating lever secured at one end to said post and rotatable thereby, the opposite end of said operating lever engaging a slide.

7. In combination, a sound reproducing device havinge a rotatable turn-table for carrying a spirally grooved record disc, a rotatable post, a tone arm secured at one end to said rotatable post and carrying at the other end a needle engageable with the groove of said record disc; rotation of said turn-table and the engagement of the groove of said record disc with said needle causing said tone arm to swing across said record and causing said post to rotate; a plurality of sheets carrying visually perceptible indicia; an operating lever secured at one end to said post and rotatable thereby, the opposite end of said lever passing through a loop on a slide; said slide being linearly slidable along a straight bar, a pin on said slide supporting one edge of each of said sheets in one position, staggered notches in said edges of said sheets successively registerable with said pin as the slide is moved by said operating lever and releasing said sheets from said pin; rotation of said operating lever moving said slide and successively presenting said sheets to view in synchronism with the record disc.

8. In combination, a sound reproducing device having a rotatable turn-table for carrying a spirally grooved record disc, a rotatable post, a tone arm secured at one end to said rotatable post and carrying at the other end a needle engageable with the groove of said record disc; rotation of said turn-table and the engagement of the groove of said record disc with said needle causing said tone arm to swing across said record and causing said post to rotate; a bound book having a plurality of swingable pages each carrying visually perceptible indicia, a base secured along the bound edge of the book, means in said device for supporting and securing said base, said book being slidable into said device and said base being simultaneously slidable longitudinally into said supporting means, means operable by said rotatable post for successively presenting the pages of said book to view in synchronism with the record disc.

9. In combination, a sound reproducing device having a rotatable turn-table for carrying a spirally grooved record disc, a rotatable post, a tone arm secured at one end to said rotatable post and carrying at the other end a needle engageable with the groove of said record disc; rotation of said turn-table and the engagement of the groove of said record disc with said needle causing said tone arm to swing across said record and causing said post to rotate; a bound book having a plurality of swingable pages each carrying visually perceptible indicia, a base secured along the bound edge of the book; a longitudinal support in said device for supporting said base; said base being slidable longitudinally into said support and being secured thereby against any movement normal to the axis of said support; means operable by said rotatable post for successively presenting the pages of said book to view in synchronism with the record disc.

10. In combination, a sound reproducing device having a rotatable turn-table for carrying a spirally grooved record disc, a rotatable post, a tone arm secured at one end to said rotatable post and carrying at the other end a needle engageable with the groove of said record disc; rotation of said turn-table and the engagement of the groove of said record disc with said needle causing said tone arm to swing across said record and causing said post to rotate; a bound book having a plurality of swingable pages each carrying visually perceptible indicia, a base secured along the bound edge of the book; a longitudinal support in said device for supporting said base; said support having a groove therein communicating with one end thereof; the base and said groove having a matching cross-section; said base being slidable longitudinally into said support and being secured thereby against any movement normal to the axis of said support; means operable by said rotatable post for successively presenting the pages of said book to view in synchronism with the record disc.

11. In combination, a sound reproducing device having a rotatable turn-table for carrying a spirally grooved record disc, a rotatable post, a tone arm secured at one end to said rotatable post and carrying at the other end a needle engageable with the groove of said record disc; rotation of said turn-table and the engagement of the groove of said record disc with said needle causing said tone arm to swing across said record and causing said post to rotate; a bound book having a plurality of swingable pages each carrying visually perceptible indicia, a base secured along the bound edge of the book; a longitudinal support in said device for supporting said base; said base having a substantially trapezoidal cross-section, said support having a matching groove of trapezoidal cross-section; said base being slidable longitudinally into said support and being secured thereby against any movement normal to the axis of said support; means operable by said rotatable post for successively presenting the pages of said book to view in synchronism with the record disc.

12. A cabinet having a top, side panels and an open front, sound reproducing apparatus having a turn-table rotatable on top of the cabinet, said turn-table carrying a spirally grooved record disc, a vertical post, a tone arm secured at one end to said vertical post rotatably mounted in the top of the cabinet, said tone arm carrying at the other end a needle engageable with the groove of said record disc, rotation of said turn-table and the engagement of the groove of said record disc with said needle causing said tone arm to swing across said record and causing said post to rotate; said post extending beneath the top of the cabinet; a bound book having a plurality of swingable pages each carrying visually perceptible indicia; a base secured along the bound edge of the book; means in said device for supporting and securing said base; and a slot in the side of said cabinet, one end of said slot registering with said base supporting means, said book and said base being slidable through said slot into said cabinet with the pages thereof supported in substantially raised position and facing the open front; a slide operable by said rotatable post in synchronism with said record disc successively dropping the pages of the book to a position where they may be viewed through said open front.

13. A cabinet having a top, side panels and an open front, sound reproducing apparatus having a turn-table rotatable on top of the cabinet, said turn-table carrying a spirally grooved record disc, a vertical post, a tone arm secured at one end to said vertical post rotatably mounted in the top of the cabinet, said tone arm carrying at the other end a needle engageable with the groove of said record disc, rotation of said turn-table and the engagement of the groove of said record disc with said needle causing said tone arm to swing across said record and causing said post to rotate; said post extending beneath the top of the cabinet; a bound book having a plurality of swingable pages each carrying visually perceptible indicia; a base secured along the bound edge of the book; means in said device for supporting and securing said base; and a slot in the side of said cabinet, one end of said slot registering with said base supporting means, said book and said base being slidable through said slot into said cabinet with the pages thereof supported in substantially raised position and facing the open front; a slide operable by said rotatable post in synchronism with said record disc successively dropping the pages of the book to a position where they may be viewed through said open front, and an additional slot in the side of the cabinet also registering with said base supporting means, the pages of the book, when they have dropped, registering with said slot, said book being removable therethrough.

14. A cabinet having a top, side panels and an open front, sound reproducing apparatus having a turn-table rotatable on top of the cabinet, said turn-table carrying a spirally grooved record disc, a vertical post, a tone arm secured at one end to said vertical post rotatably mounted in the top of the cabinet, said tone arm carrying at the other end a needle engageable with the groove of said record disc, rotation of said turn-table and the engagement of the groove of said record disc with said needle causing said tone arm to swing across said record and causing said post to rotate; said post extending beneath the top of the cabinet; a bound book having a plurality of swingable pages each carrying visually perceptible indicia; a base secured along the bound edge of the book; means in said device for supporting and securing said base; and a slot in the side of said cabinet, one end of said slot registering with said base supporting means, said book and said base being slidable through said slot into said cabinet with the pages thereof supported in substantially raised position and facing the open front; a slide movable linearly by said rotatable post in synchronism with said record disc and carrying a member for supporting said pages of said book in raised position; additional means for supporting said pages of the book out of contact with said member until the book is in operative position and the record and tone arm adjusted, means for shifting the pages of said book from said additional means to said member, the movement of said slide and said member thereafter successively dropping the pages of the book to a position where they may be viewed through said open front.

LAWRENCE WISE.